US007106656B2

(12) United States Patent
Lerro et al.

(10) Patent No.: US 7,106,656 B2
(45) Date of Patent: Sep. 12, 2006

(54) SONAR SYSTEM AND PROCESS

(75) Inventors: Donald Lerro, Colchester, CT (US);
Larry Freeman, Potomac, MD (US);
John Green, Jewett City, CT (US);
David Ashworth, McLean, VA (US)

(73) Assignee: AC Capital Management, Inc., Wilmington, DE (US)

( * ) Notice: Subject to any disclaimer, the term of this patent is extended or adjusted under 35 U.S.C. 154(b) by 21 days.

(21) Appl. No.: 10/953,300

(22) Filed: Sep. 29, 2004

(65) Prior Publication Data

US 2006/0007784 A1 Jan. 12, 2006

Related U.S. Application Data

(60) Provisional application No. 60/506,507, filed on Sep. 29, 2003.

(51) Int. Cl.
*G01S 15/32* (2006.01)
(52) U.S. Cl. ...................................................... 367/99
(58) Field of Classification Search ................ 367/99, 367/100, 101, 102
See application file for complete search history.

(56) References Cited

U.S. PATENT DOCUMENTS 4,209,783 A 6/1980 Ohyama et al.

| 4,721,385 A | 1/1988 | Jelalian |
| 4,961,174 A | 10/1990 | Teel et al. |
| 5,150,335 A | 9/1992 | Hoffman |
| 6,128,249 A | 10/2000 | Sullivan |

OTHER PUBLICATIONS

Irza et al; A low frequency high resolution sonar for AUVs; Autonomous Underwater Vehicle Technology, 1992. AUV '92., Proceedings of the 1992 Symposium on Jun. 2-3, 1992, pp. 215-218.*
Burdic, W. S., Underwater Acoustic Analysis, Prentice Hall, Englewood Cliffs, NJ. 1984.
Nielson, R. O., Sonar Signal Processing, Artech House, Norwood MA, 1991.
Skolnik, M. I., Introduction to Radar Systems, McGraw Hill, New York, 1962.
Urick, R.J., Principles of Underwater Sound, McGraw Hill, New York, 1975.
Widrow, B., Stearns, S., Adaptive Signal Processing, Prentice Hall, Englewood Cliffs, NJ. 1985.
Marcelo O. Magnasco; The Cochlear Tuning Curve, arXiv: physics/ 0111204 v1 -Nov. 21, 2001.
R.S. Thoma, et al. "Identification of Time-Variant Directional Mobile Radio Channels" 9. Virginia Tech Symposium on Wireless Personal Communic., Blacksburg, USA, 1999, pp. 11.

* cited by examiner

*Primary Examiner*—Dan Pihulic
(74) *Attorney, Agent, or Firm*—Kelley Drye & Warren LLP

(57) ABSTRACT

A sonar system and method of use capable of discriminating a direct acoustic signal present at 60 dB or more above the acoustic echo signal.

51 Claims, 10 Drawing Sheets

SONAR SYSTEM AND PROCESS

This application claims benefit under 35 U.S.C. ¶119(e) of U.S. Provisional Application Ser. No. 60/506,507, filed on 29 Sep. 2003.

FIELD OF INVENTION

The present invention is generally related to Sonars. In particular, it is related to an active sonar system capable of receiving and transmitting sound signals simultaneously.

BACKGROUND OF INVENTION

SONAR (Sound Navigation and Ranging) is a technique that uses sound propagation under water to navigate or to detect objects in or on the water. As is known in the art, there are two types of sonar: passive and active. Passive sonar seeks to detect an object target by listening for the sound emanating from the obejct being sought. Active sonar creates a pulse of sound, and then listens for reflections of the pulse from a target object. To determine the distance to the target, elapsed time from emission of a pulse to reception is measured. To determine the directional bearing, several hydrophones are used to measure the relative arrival time to each in a process called beam-forming The ability of a system to detect desired sound, or 'signal', in the presence of interfering sound, (i.e. noise or reverberation) is generally referred to as its 'Recognition Differential' (RD). RD is defined as the Signal-to-Interference ratio at which the system can, with some specific probability (usually taken at 50%), detect the signal while not exceeding a specified probability of false alert. RD is usually expressed in Decibels (dB). The lower the RD, the better the system performs.

It has been shown that the longer the 'look' or processing time, the lower the RD (see for analysis Burdic, W. S., *Underwater Acoustic System Analysis*, Prentice Hall, Englewood Cliffs, N.J., 1984). Since passive sonar systems can always be in a listening or 'receive' mode, and generally seek target signature components that are continuously radiating, they are able use many minutes of processing time and thus able to achieve very low RDs. By contrast, conventional active sonar systems typically use short pulse type transmissions and their receive processing time is therefore limited to a very few seconds, or even only fractions of a second. Consequently, active sonar RD are generally 10 to 30 dB higher than those of passive systems; this is equivalent to one to three orders of magnitude in linear terms.

Conventional active sonars are typically limited to relatively short duration pulse type transmissions for a number of reasons. One reason is that in some environments unwanted reverberation builds up as transmission times increases; this is particularly relevant to limited bandwidth systems in shallow water environments. A more fundamental reason is that most active sonars systems cannot receive while they are transmitting. Often, this is because they use the same device, (called a 'transducer'), to both transmit and receive, and transducers cannot do both at the same time. Such systems are necessarily 'mono-static', meaning that their transmissions and receptions take place at one location. (Note that the converse is not necessarily true; some mono-static systems use co-located but separate devices for transmission & reception.) Most generally however, the inability to receive while transmitting is because active sonar transmission levels are inevitably so much higher than the levels of the echoes being sought that the acoustic transmit level overloads, or at least effectively 'jams', the receiver being used. This is even true for most so-called bi- or multi-static systems, where transmitting & receiving are done by separate devices located some distance apart.

It would be desirable to have a sonar system that would permit substantially continuous stream of incoming data that would not be limited to highly direction transmitters or high frequencies, particularly in sonar systems dedicated to the detection of targets, such as submarines, which are seeking to escape detection.

In prior art, U.S. Pat. No. 5,150,335 by Hoffman describes a waveform generation and processing technique that could be used to resolve Doppler and range ambiguity using interrupted frequency modulation for continuously transmitting sonar. Hoffman, however, does not address linearity and rejection criteria and therefore fails to teach those elements necessary to effectively to detect echoes while transmitting.

Teel et al., on the other hand, address in U.S. Pat. No. 4,961,174 the need for acoustic isolation from the transmitter and receiver and does so with physical vertical separation requiring a strong acoustic layer not processing rejection as in this approach and is therefore limited to relatively few specific environments (e.g., deeper water applications) and can be avoided by an intelligently operated object such as a submarine. U.S. Pat. No. 6,128,249 by Sullivan discusses a method of continuously transmitting by using sequences of tones each separated sufficiently in frequency to avoid interference. Sullivan like Hoffman does not address linearity and rejection criteria, and the series of tones used by Sullivan fail to permit effective range resolution and reverberation rejection.

In sum, the art fails to show how to effectively discriminate between signals that sonar receives from its own transmitter and echoes from the intended target subject to certain linearity and rejection requirements.

SUMMARY OF INVENTION

The present invention involves an active sonar system capable of continuously receiving while transmitting. Further provided is a method of operating the sonar system subject to a unique set of linearity and rejection requirements. The system's receiver may discriminate (in bearing, range, and/or frequency) between the signal it receives from its own transmitter and the reflected signals, or echoes, it receives from the intended target(s) even while the system is transmitting. The sonar provides improved differential gains in reverberation and noise and rapid target detection.

One embodiment involves an active sonar system for detecting object(s) in water. The system comprises a transmitter capable of continuously transmitting an acoustic signal; a receiver capable of receiving a reflected acoustic echo of said acoustic signal from said object(s), and a direct acoustic signal from said transmitter. The receiver is capable of discriminating between the direct acoustic signal and the acoustic echo signal it receives from the object while the transmitter is transmitting. The discrimination can occur when the direct acoustic signal is present at 60 dB or more above the acoustic echo signal.

Another embodiment provides a method for detecting sonar signals. The method involves transmitting an acoustic signal. During the transmission of the acoustic signal, a receiver receives a reflected acoustic echo of the acoustic signal from object(s), as well as directly receiving the acoustic signal. A signal of the acoustic echo and the direct acoustic signal are processed in a manner to discriminate between the acoustic echo signal and the direct signal when the direct acoustic signal is present at 60 dB or more above the acoustic echo signal.

Still another embodiment provides method for detecting sonar signals comprising: generating a waveform; performing waveform shaping to avoid signal discontinuities; transmitting the waveform acoustically; directly receiving the acoustic waveform and reflected echoes of the acoustic waveform; performing temporal frequency rejection on the received acoustic waveforms; and optionally performing the step of spatially filtering the received acoustic waveform; and optionally tracking the detected reflected echoes.

DETAILED DESCRIPTION

The present invention involves an active "receive-while-transmit (RWT)" sonar system capable of continuously receiving while transmitting, and provides a method of operating the sonar system subject to linearity and rejection requirements according to the invention. The system's receiver discriminates (in bearing, range, and/or frequency) between the signal it receives from its own transmitter and the reflected signals, or echoes, it receives from the intended target(s) even while the system is transmitting. This is accomplished by incorporating into the system a receiver having a large dynamic range (the ratio of minimum to maximum input levels over which the receiver's output level remains linearly proportional to the level of the receiver's input), as explained in more detail below.

Figure 1A:
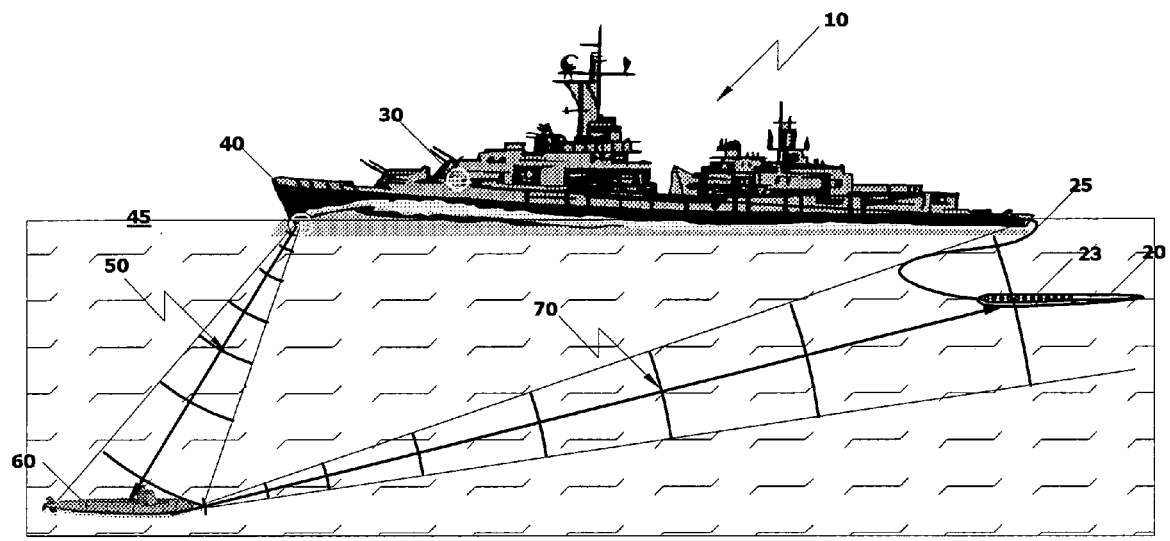
FIG. 1a is a drawing of a sonar system in the field showing the relationship between ship-board electronics, transmitter, target and a receiver sonobuoy, according to the present invention.

FIG. 1a shows an embodiment sonar system employed on a surface ship 10 in conjunction with a submerged craft 20 carrying an array of acoustic sensors or receivers, such as hydrophones 23 towed by surface ship 10. Cable 25 which tows the craft also includes electronic transmission means, such as conductive wires, for supplying electronic signals from array 23 to a data processing center and display 150 on surface ship 10. In active mode, active transmitter 40 below the water line 45 transmits an acoustic signal 50. The signal is reflected from target 60 as acoustic ethos 70 and detected by receiver 20. Receiver 20 may comprise one or more of hydrophones 23. At the same time, the acoustic signal transmitted by transmitter 40 is directly received by receiver 20 as a direct signal 80 from the transmitter. The signals are processed on-ship board electronics 30.

Figure 1B:
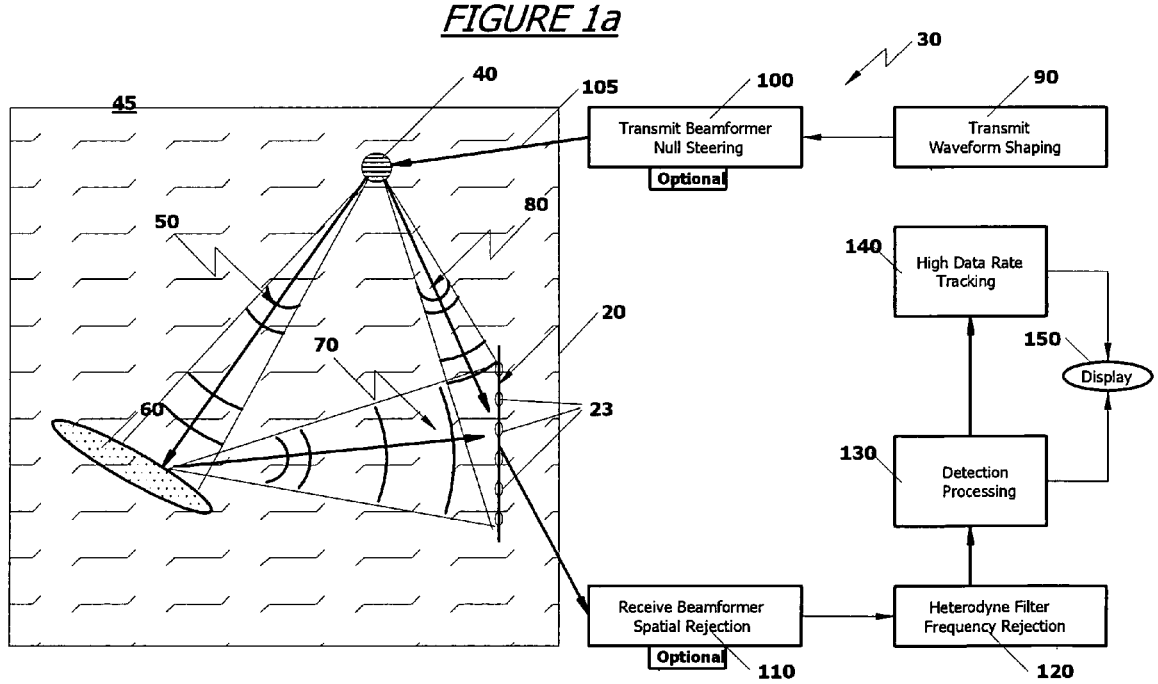
FIG. 1b is a schematic drawing of an embodiment showing the various components of the ship-board electronics and its relationship to a transmitter, a target, and a receiver below the water-line, according to the present invention.

Ship-board electronics 30 is shown in more detail in FIG. 1b. Active transmitter 40, target 60 and receivers 20 below the water line are also shown in relation to the electronics of the same figure. In one embodiment of the present invention, an excitation signal is generated to transmit a wave form 80 either directly to transmitter 40 or, optionally, through transmit beamformer 110. After the transmitted signal 105 returns to receiver 20, the signal is either directly passed through a heterodyne filter 120 or, optionally, through a receive beamformer 110 before the signal is processed 130, and subject to high data rate tracking 140, as explained further below. The result is displayed on display 150.

In an aspect of an embodiment shown in FIGS. 1a and 1b, transmitter 40 transmits an acoustic signal continuously. The signal is omni-directional and arrives at an object, such as 60 in both Figures, and at its own receiver 20. The acoustic signal may be less than or equal to 12 kHz, or $\leq 10$ kHz or even $\leq 15$ kHz. In an aspect of the invention, the acoustic signal travels with a reduced level of energy in the direction 80 of receiver 20. The energy level may be reduced from about 3 dB to about 60 dB, or from about 5 dB to about 25 dB, or from about 25 dB to 55 dB. Furthermore, transmitter 40 can transmit a frequency modulated signal, a sweeped frequency modulated signal, or a linear sweeped frequency modulated signal. The modulated signal is amplitude tapered to avoid frequency discontinuities, which are well observed in the art. The transmitter and the receiver may be separated by 12 acoustic wavelengths or less.

Receiver 20 receives signal directly 80 from its own transmitter 40 as well as echo signal 70 reflected from object 60. The receiver may comprise a vector sensor or an array of vector sensors. The receiver has a dynamic range greater than about 80 dB and is capable of discriminating between the direct acoustic signal and the acoustic echo signal it receives from the object while the transmitter is transmitting. The object may be still or in motion. In an aspect of the invention, the discrimination can occur when the direct acoustic signal is present at 60 dB or more above the acoustic echo signal. The discrimination capability is achieved by temporal frequency filtering and spatial filtering which attenuates the direct signal, as described further below.

Figure 2A:
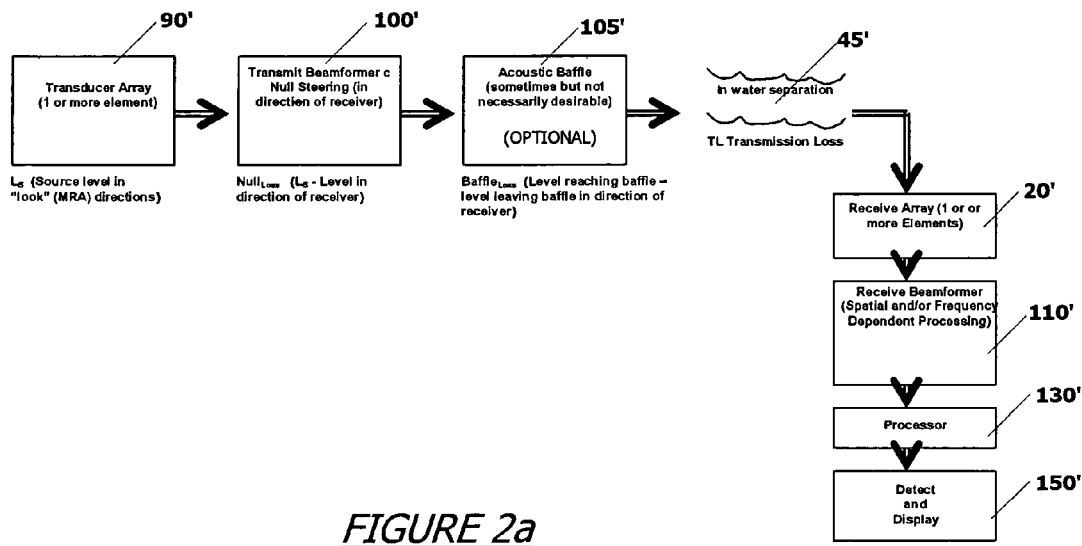
FIG. 2a is a drawing showing a more detailed rendition of the ship-board electronics shown in FIG. 1b in accordance with the present invention.

An embodiment of the system shown in FIG. 2a is capable of detecting an object 60 at a range greater than 5, and 10 kiloyards from receiver 20. The system is capable of detecting an object at the same depth as either the transmitter or the receiver. In another aspect, the system is capable of detecting an object at a depth other than the depth of either the transmitter or the receiver as well as detecting an object underneath the ocean floor. Furthermore, the system is capable of detecting an object at any bearing in respect of the receiver.

In one aspect, for the system receiver 20 to be able to discriminate (in bearing, range, and/or frequency) between the direct signal 80 it receives from its own transmitter 40 and the echoes 70 it receives from the intended target(s) 60 even while the system is transmitting, two conditions must be met: in one aspect, the acoustic level received at the receiver may not exceed (or at least may not significantly exceed) the sum of the receiver's Minimum Detectable Signal dictated by the acceptable sea noise floor plus its Dynamic Range; that is, the received level may not overload the receiver. This aspect will be referred to as the 'linearity' requirement (or leveling) of the invention. Second, the receiver must be capable of sufficiently rejecting, in either or both the bearing and frequency domains, the transmitted signal so that it does not raise detection thresholds in the receiver's search domain. That is, the system must not 'jam' itself in the direction(s) and frequency regimes in which it seeks to obtain an echo from the target. This other aspect may be referred to as the 'rejection' requirement and it can generally be accomplished through a combination of beam/filter shading to attain adequate side lobe control and adaptive/notched filtering to further discriminate against the levels received directly from the transmitter.

The linearity requirement of such embodiment is shown in FIG. 2a where the numbering scheme of FIGS. 1a and 1b is followed for ease of relating the various parts of the invention, the primed numerals referring to similar parts throughout the several views. One or more elements of a transducer array 90' transmit wave forms at a source acoustic level $L_S$ (LS) in the direction of target (60 in FIG. 1b). Beamformer 100' transmits in the direction of receiver (20 in FIG. 1b) for null steering which yields $Null_{loss}$ equivalent to $L_S$-Level in direction of receiver. An acoustic baffle 105' may also be used, though not necessarily desirable at times due to Baffle Loss (Level reaching baffle—level leaving baffle in direction of receiver). The acoustic signal travels through water separation 45' suffering transmission loss (TL), as shown in FIG. 2a. The linearity requirement of receiver array 20' comprising one or more hydrophones is formed by establishing a relationship between the various parameters of the system as given by the following equation:

$$LS-\{TN+TL\} \leq NL+DR \quad \text{(Equation I)}$$

where
  LS—Source Level in Direction of Target
  DR—Dynamic Range of the system
  TN—Transmit Spatial Null in the Direction of the Receiver
  TL—Transmission of Loss from Transmitter to Receive Element(s)
  NL—Receiver Noise Level As an exemplary typical system, consider a 2 KHz (2000 Hertz) transmitter array of approximately 20 elements (hydrophones) designed to provide an approximately 225 dB source level, functionally comparable to an array operated with a high dynamic range towed array. Assuming LS=225 dB, DR=120 dB, TN=25 dB, TL=40 dB, NL=50 dB, and the above linearity relationship shows $$160 \text{ dB} \leq 170 \text{ dB}$$

Hence, the linearity requirement is satisfied. It will be known to those skilled in the art that several of the loss terms used above is conservative. For example, most bi-static or multi-static configurations involve transmission losses of 50 dB to 80 dB vs. the 40 dB value used here, thus negating the need for transmit null steering or baffles. Similarly, as frequency is reduced, sea noise, and therefore Minimum Detectable signal Level is increased, again reducing the need for null transmit steering and/or baffles.

It will also be noted in the example above that a received level of 160 dB while well within the dynamic range of such exemplary system, would also be above the system minimum detectable level of the noise floor. Since the system remains linear, it is now possible to provide a combination of spatial and frequency based "notch filtering" techniques to further reject the transmit signal from interfering with reception.

In addition to the linearity requirement defined above, another aspect of an embodiment of the present invention establishes a requirement for direct signal (80 in FIG. 1b) rejection.

It will be known to those skilled in the art that in any continuous transmission approach, a strong transmission to the receiver will have the adverse effect of masking the reception of target echoes of interest. In a method employing a separate transmitter and receiver, a bi-static scenario inherently exists and the transmitted energy will appear at a fixed time delay or at multiple time delays due to multi-path arrival. With a Frequency Modulated Continuous Wave (FM-CW) transmission the time delay of the return corresponds to a frequency shift of the received waveform. The transmitted energy received directly will be strong relative to the level of the desired reception and frequency sideband leakage becomes a dominant source of noise. This problem can typically be handled by using frequency filtering with extremely low side band response. This linear frequency filtering may optionally be augmented by non-linear adaptive frequency cancellation at the receiver. If the receive sensor contains an array of hydrophones then receive beam-forming may also be used to suppress signals arriving from the direction of the source. This receive beam-forming may use either a conventional linear or an adaptive approach. If the source has sufficient directionality then it may also be possible to steer a null of the source transmission beam in the direction of the receiver. Transmit signal rejection at the receiver can be performed using spatial or frequency domain techniques. Depending on the sensor system either one or both spatial and frequency rejection can be applied.

In another embodiment, the direct signal rejection requirement of the present invention involves a spatial (bearing) component and a frequency (range) component. Thus, defining parameters,
  RS—Spatial Side lobe Rejection
  NDI—Receiver directionality against noise RSR—Receiver Spatial Rejection Against Signal
RFR—Receiver Frequency Rejection then the rejection requirement in terms of an Interference Level (I) requirement is expressed by the equation:

$$I = LS - TN - RS - TL - RSR - RFR < NL - NDI \quad \text{(Eq. II)}$$

Spatial and/or frequency dependent processing 110', 130' are shown in FIG. 2a followed by the displaying of the detection of the target on display 150'.

It will be noted that the conventional beam-forming techniques provide spatial rejection where the level of rejection typically is determined by the number of hydrophones available and their spacing. Beyond conventional approaches adaptive techniques that are used to cancel known signals or "anti-jamming" methods can be applied to provide additional direct signal rejection.

It will also be noted that the present invention can readily take advantage of modern high performance digital electronics in which the spatial and frequency notch filtering design methods can readily exceed the rejection requirement. A heterodyned FM approach may be used to translate frequency into range thus turning spatial beam forming & frequency filtering into the range and bearing information provided by conventional active pulsed sonar. This may be accomplished using adaptive noise cancellation techniques and appropriate high rejection side lobe methods (see, e.g., Widrow, B., Stearns, S. Adaptive Signal Processing, Prentice Hall, Englewood Cliffs, N.J., 1985).

Figure 2B:
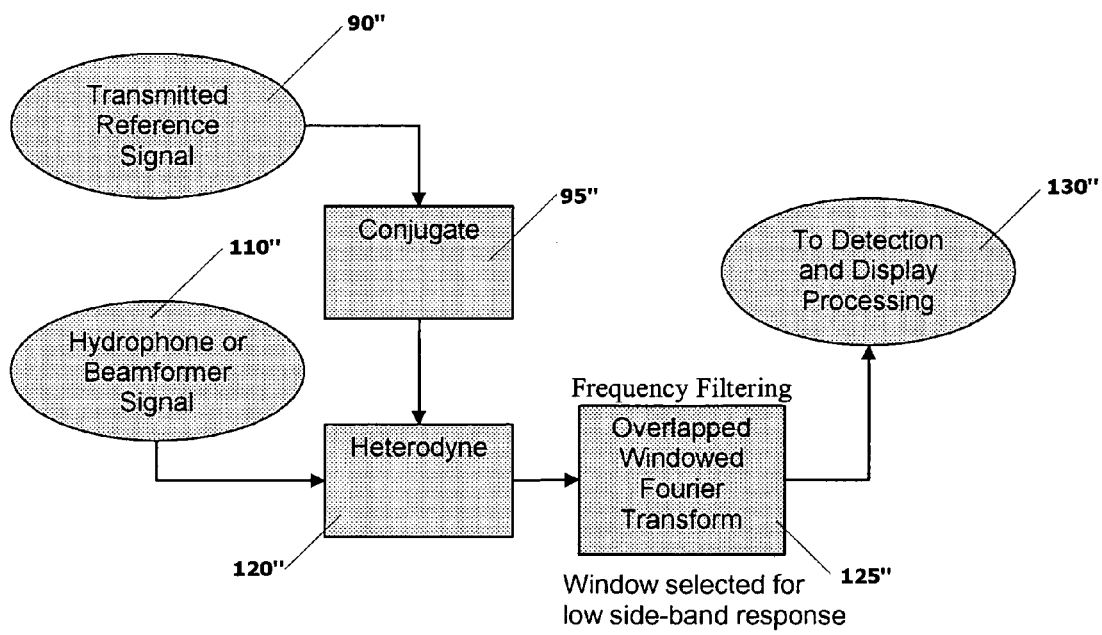
FIG. 2b is a schematic drawing showing the frequency filtering section of ship-board electronics of the receive-while-transmit sonar of the present invention.

An embodiment of a heterodyned FM approach is shown in FIG. 2b following element 120 of FIG. 1b and as a part of element 110' in FIG. 2a. In FIG. 2b, received signal from a hydrophone 110" or array of hydrophones which have been spatially filtered to obtain beam data is heterodyned 120" with a local signal that has the negative of the frequency shifts of the received signal to generate a fixed frequency signal. Any local signal that has the negative of the transmitted frequency shifts may be used. A convenient local reference is the transmitted signal 90". Heterodyning with a real transmit signal creates both sum and difference frequencies with the desired difference frequency out of the heterodyne block selected by the following frequency filtering. With complex (analytic) signals using the conjugate 95" of the transmit replica yields only the difference frequency out of the heterodyne stage. Frequency filtering with low side bands is achieved by using a Fourier transform 125" with a shading window which provides tapering selected for low side-bands. Many low side band windows are available, for instance Chebychev or Taylor or Kaiser-Bessel windows may be generated with any desired theoretical side lobe level. The output of the above processing chain (as processed in element 130" of FIG. 2b) for a linear FM transmit sweep with data captured in a lake test on a single hydrophone is shown below in FIG. 2c. It will be noticed that greater than eighty decibels of side band rejection 160 is achieved with frequency filtering alone. The data corresponding to reverberation and direct signal are shown by reference numerals 170 and 180, respectively.

An analysis of a direct signal rejection requirement is provided by applying Equation II to the same analysis used in Equation I above for determining the linearity requirement. Using the values of the previous analysis, namely, LS=225 dB, TN=50 dB, TL=40 dB, NL=50 dB, NDI=25 dB, RS=35 dB, and applying both the spatial and frequency filtering so that RSR=10 dB and RFR=70 dB, Equation II yields:

$$I = 20 \text{ dB} \leq 25 \text{ dB}$$

thus, meeting the rejection requirement with the direct signal being 5 dB less than the noise level of the receiver.

In another analysis of an application of the present invention, a bi- and multi-static operation at mid-frequencies is provided. In an aspect of the invention, there is disclosed standalone sonar processing capability using off-board sources and fixed sources, such as a sonobouy. The primary difference from the analysis above is that spatial rejection at the receiver is minimized due to the use of a single element sonobuoy although directionality is obtained by processing orthogonal channels in dipole or cardiod mode. Similarly a directional transmission to reduce levels toward the receiver is difficult due to the fact they operate in a field. Therefore, assuming, for this analysis, LS=200, TN=0 dB, NL=40 dB, NDI=5 dB, RS=20 dB, TL=55 due to farther spacing between source and receiver, RSR=10 dB for adaptive spatial processing, and that a reasonably clean frequency transmission and frequency filtering can achieve RSR=85 dB, the interference level from Equation II becomes $$I = 30 \text{ db} < 35 \text{ dB}$$

Hence the direct signal would be a resultant 5 dB less than the noise level of the receiver and this requirement is again attainable.

Figure 2C:
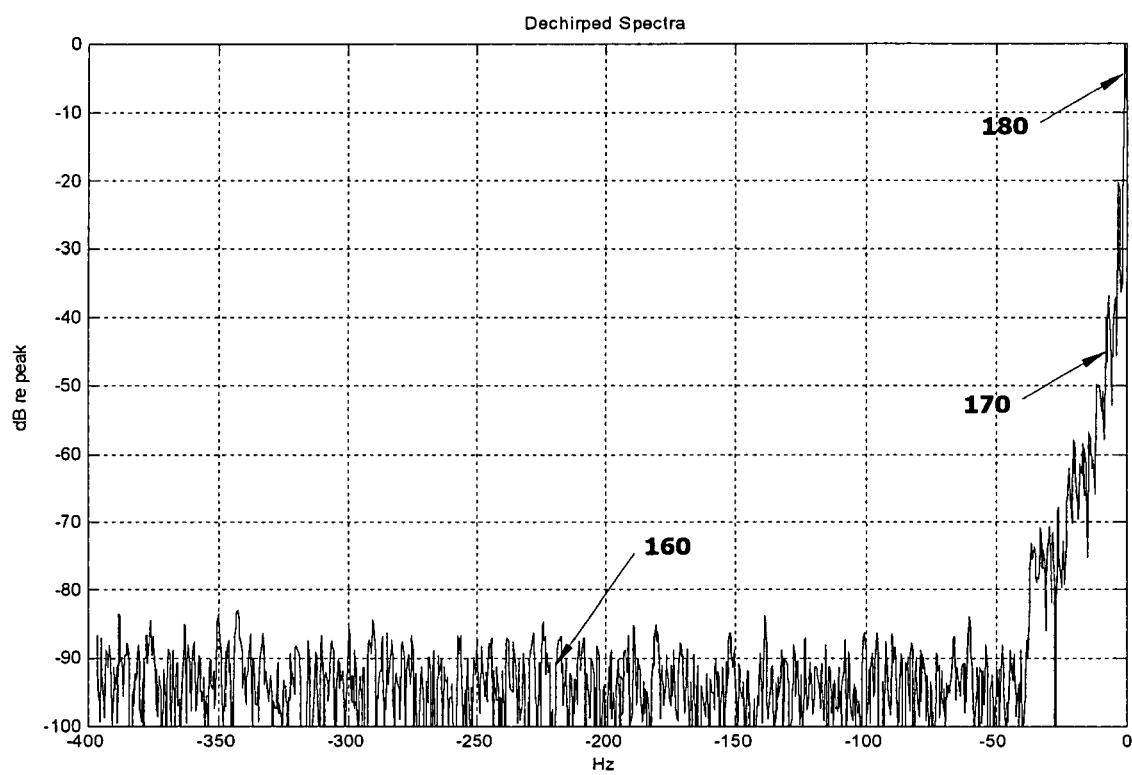
FIG. 2c is a graphical drawing showing an output of the frequency filtering section of FIG. 2b for a linear frequency modulated transmit sweep with data captured on a single hydrophone, according to the present invention.
Figure 2D:
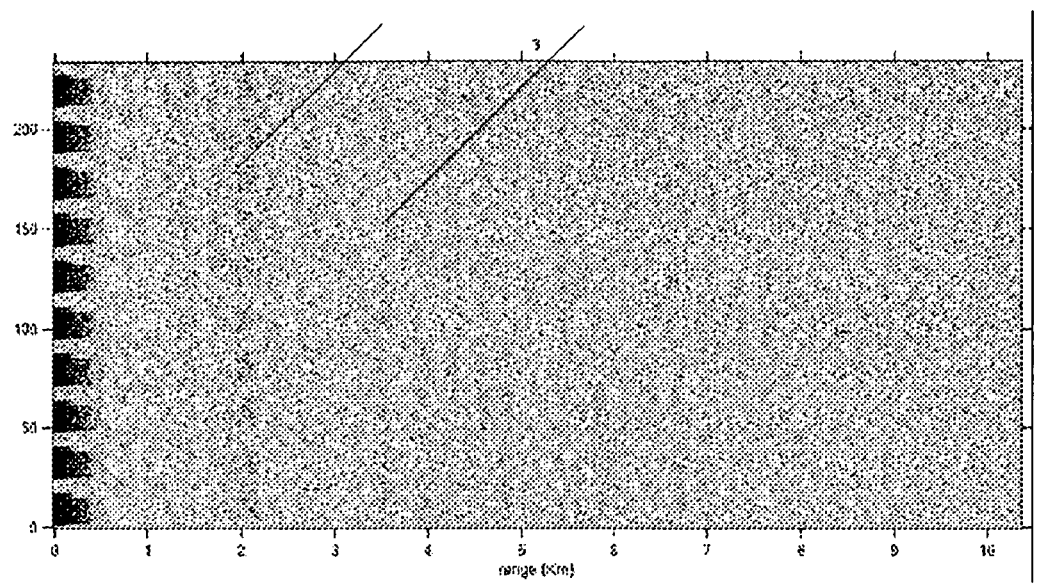
FIGS. 2d and 2e are graphical drawings showing heterodyne output from an experiment in a lake where in FIG. 2d shoreline edge of the lake can be seen at 2 kilometers and 3.5 kilometers, in accordance with an embodiment of the present invention.
Figure 2E:
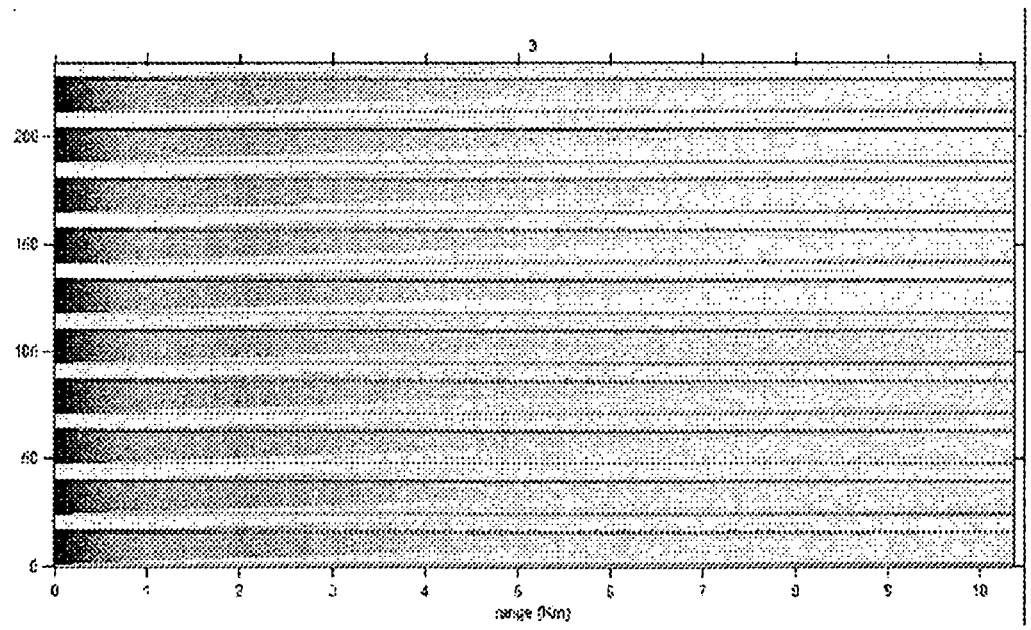

In an experiment that was conducted in a lake using the frequency domain rejection technique described above, it was shown that echoes could be received while transmitting even without transmit beamforming or receive array directivity. The experiment involved analyzing data from a single, non-directional hydrophone placed so that it received the maximum, rather than the "nulled" transmission from a low frequency (1 kHz) acoustic source only about 15 meters away. FIGS. 2c and 2d illustrate the receive heterodyne output level for 10 consecutive 15 second swept transmissions stacked up vertically from 850–1150 Hz. The FIG. 2c is normalized to show defections above the local noise level. The shoreline edge of lake can be seen clearly at 2 kilometers and 3.5 kilometers. FIG. 2d shows absolute receiver levels and indicates that minimum detectable level of the ambient noise can be reached and occurs at about 6.5 km during each transmission.

Figure 3A:
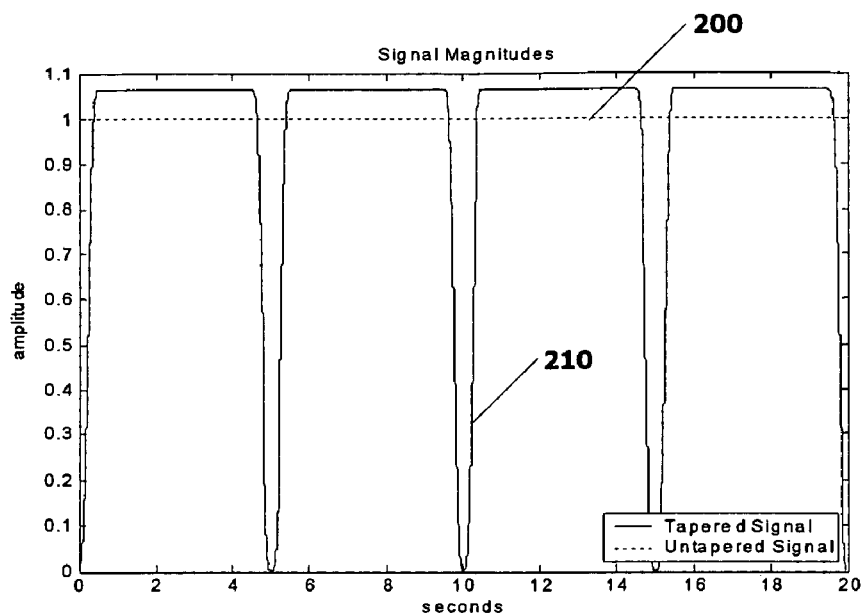
FIG. 3a is a graphical drawing showing the amplitude of a signal with and without tapering, according to the present invention.
Figure 3B:
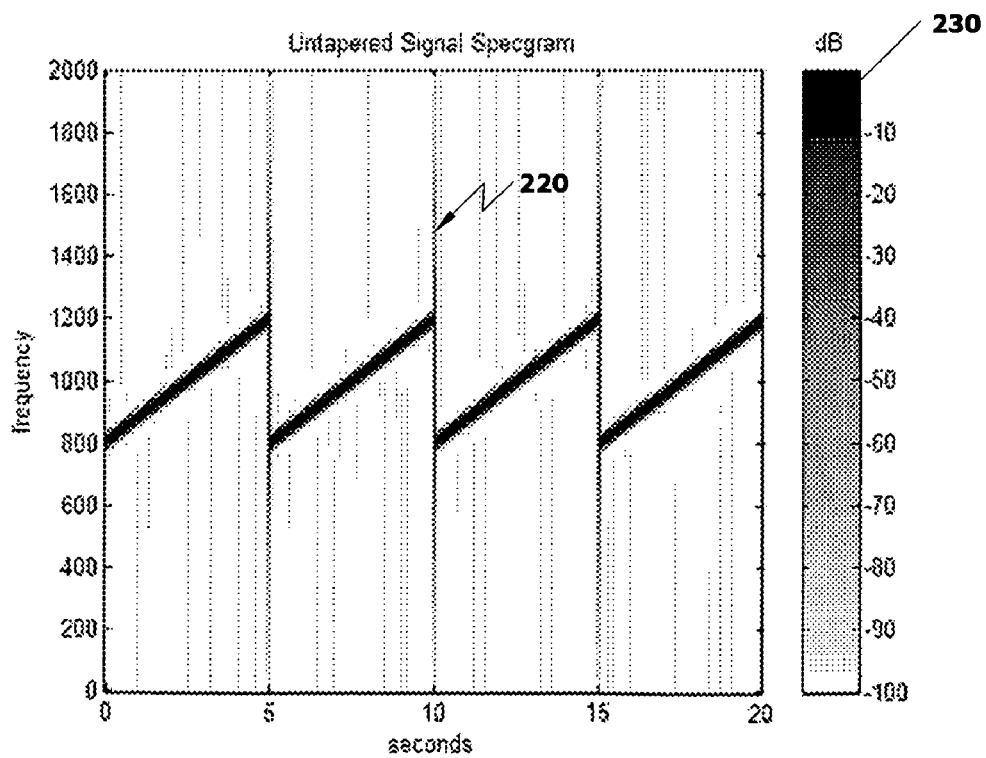
FIGS. 3b and 3c are graphical drawings showing the spectrum over time without and with the signal (of FIG. 3a) tapered, respectively, in accordance with the present invention.
Figure 3C:
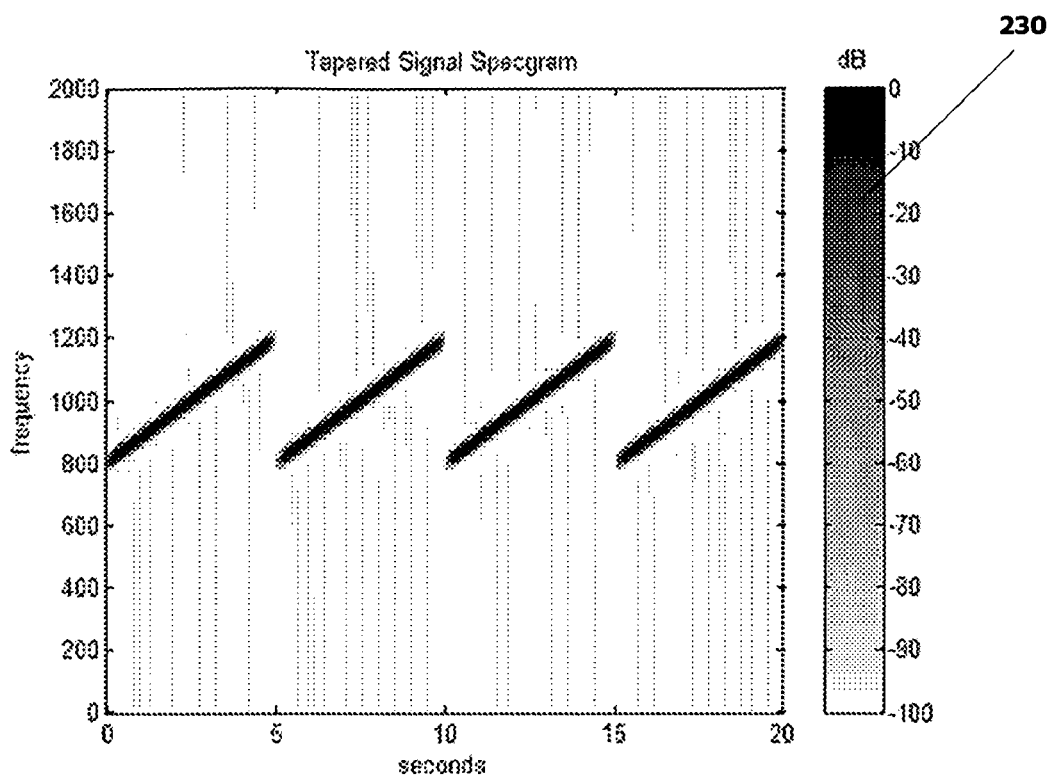
Figure 4A:
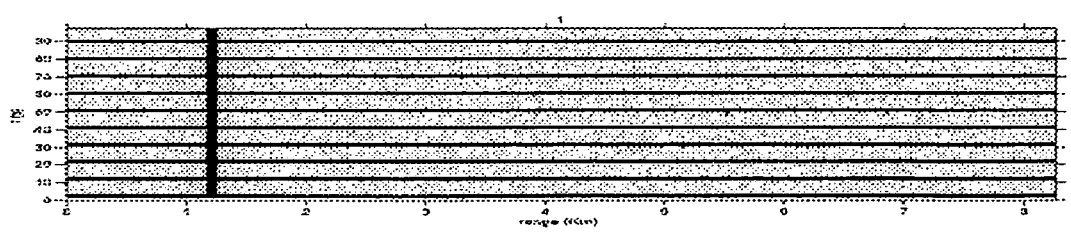
FIGS. 4a and 4b are drawings showing the effect of an illustrative detection display without and with proper signal tapering to minimize signal interference, according to the present invention.
Figure 4B:
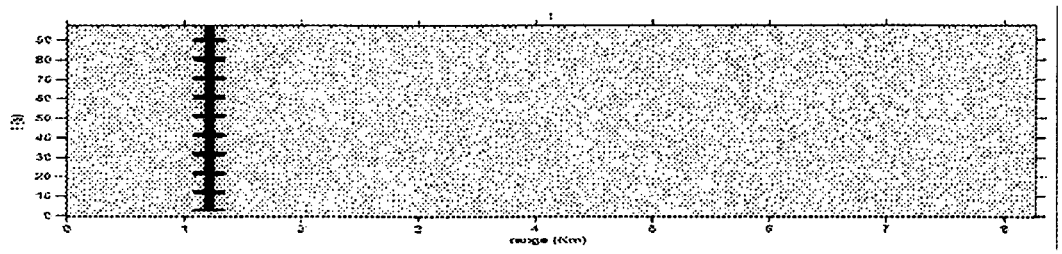

In an aspect of another embodiment, in order to allow the target signal to be separated from the directly received transmitted signal with frequency filtering, the spectral energy of the transmitted signal is not allowed to leak into the received frequency band. A window is used to taper the onset and termination of transmission segments where abrupt changes in transmission frequency would normally cause transmission energy to spread over a wide frequency band. By smoothly tapering the onset and termination amplitudes of each segment from zero to maximum amplitude the frequency spreading may be controlled. A typical tapering for four transmit segments is shown in FIG. 3a where the taper is computed from the integral of a Chebychev window. The images in the Figure show the effect of tapering on the signal's spectra-gram and on a typical final processed display. FIG. 3a illustrates the amplitude of the signal with 210 and without 200 tapering. FIGS. 3b and 3c show the spectrum over time without and with the signal tapered, respectively. It is shown that the tapering reduces the interference 220 in frequency induced by the signal discontinuity. In both FIGS. 3b and 3c the spectrum scale is shown on the vertical tape 230. FIGS. 4a and 4b show the effect on an illustrative detection display again without and with proper signal tapering, respectively, to minimize signal interference. Both figures show heterodyne display.

Figure 5:
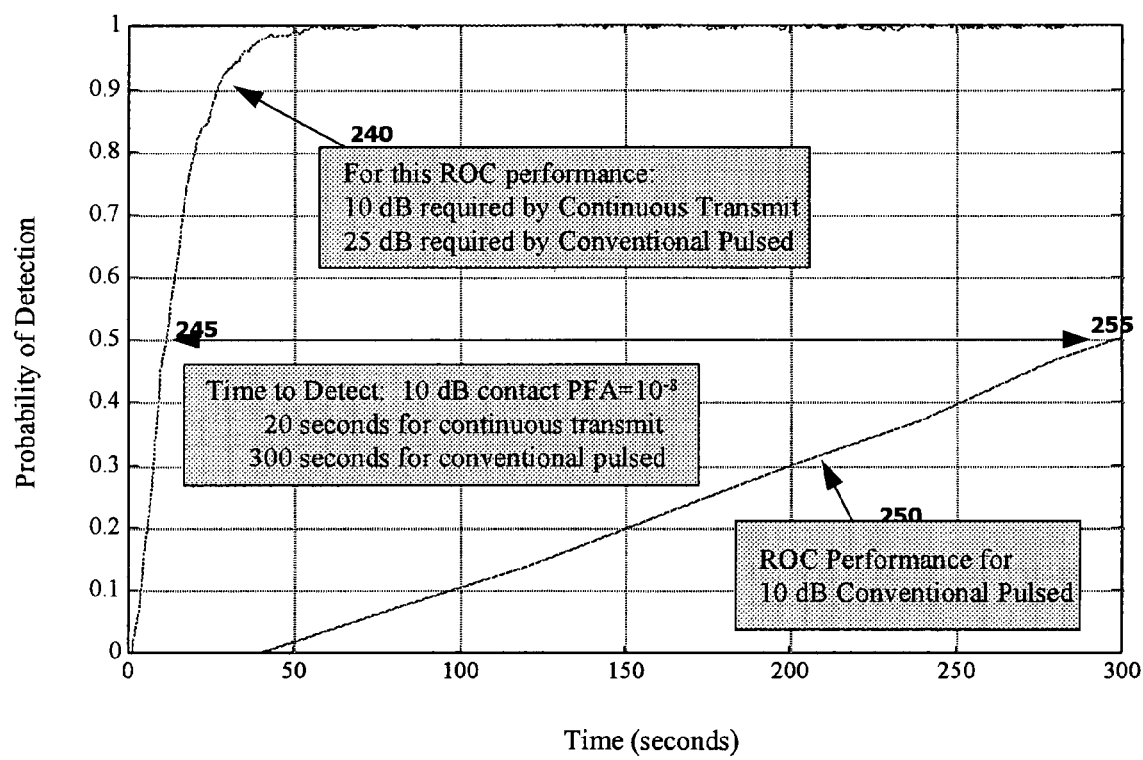
FIG. 5 is a graphical drawing showing a comparison, between conventional pulsed sonar and the receive-while-transmit sonar, of the probability of detection of a target as a function of time, and improvement in detection time in accordance with the present invention.

An aspect of a high data rate tracking component 140 of the sonar system shown in FIG. 1b provides information rate detection gains which are not attainable conventionally. Detection, localization and tracking entails the processing of acoustic measurements obtained from a target over time to estimate its current state which can contain both kinematic and feature components. The kinematic components may consist of position, velocity, and acceleration, while analysis of feature component are radiated signal strength, spectral characteristics, and target highlight characteristics useful for classification. The sonar measurements are noise corrupted observations related to the state of the target or attributes of the target. In both passive and active sonar applications measurements are received from the sensor that do not originate from a target of interest due to several types of interfering sources. Acceptable false alarm rates are rarely obtained using a single set of measurements in time hence, track before detect techniques are required. Reduction in the time between observations greatly reduced uncertainty of target location and dramatically improves detection performance The results that are shown in FIG. 5 for a target 60 moving at 3 knots relative to a receive platform 20 shown in FIG. 1a demonstrate the active sonar detection and localization that may be achieved in steps 130 and 140 shown in FIG. 1b. In achieving the results shown below, such system provides reliable and rapid decisions about the presence of a contact with a target while attempting to reject a high number of false alerts due to reverberation backscattering that appear spatially correlated from ping to ping. Reducing the time between observations greatly improves reliable track confirmation. Due to the uncertainty of target motion, multiple observation association requires track filtering and track gating to spatially locate the correct measurement at each observation time for use in track updating and the track decision process. The uncertainty of echo location increases proportionally to the time between observations.

Conventional pulsed systems require 12–20 pings (2–5 minutes depending on the range coverage) to make a reliable decision. As would be understood, embodiments of the invention provide near continuous updates of information, with time between measurements reduced by an order of magnitude from pulsed systems, i.e. 10 times as many looks at a target than a pulse system in the same fixed period of time. This information rate gain and the advantages of reduced uncertainty in echo location from ping to ping (track gates) may lead to a 12 dB reduction in detection threshold.

The detection performance gains using continuous transmission over conventional pulsed sonar operating over the same transmission band are due to the increased rate of target information acquired. The improved time to detect for a 10 dB contact at 10 kiloyards moving at 3 knots relative to the receive platform is shown in FIG. 5 mentioned above. Curve 240 represents the performance of the continuous, that is, "receive-while-transmit" system of the present invention compared with a curve 250 showing the performance of a conventional, pulsed system, each operating at 10 dB. The probability of detection, $P_D$, plotted as a function of time shows that a level of detection $P_D$=0.5 is achieved in 20 seconds 245 for the continuous transmission approach 240 whereas the pulsed system 250 requires 300 seconds (5 minutes) 255 to detect. Furthermore, to achieve an equivalent level of detection a pulsed system would require >25 dB SNR, which is 15 dB more than that required by the continuous transmission approach.

It will be evident to those skilled in the art that the instant method of active "receive-while-transmit (RWT)" provides substantial performance improvements over the conventional sonar: recognition differential gains of 7 dB in reverberation and 20 dB in noise are achieved along with the advantage of detecting a target 15 times earlier. As is shown in the analysis (for the example of FIG. 5) below, a continuous transmission over a frequency spectrum of 1 KHz provides rapid motion discrimination for targets moving at less than 1 knot with acoustic detection improvements in excess of 20 dB for submerged contacts in shallow water noise limited conditions. The analysis shown below provides a specific quantitative analysis of how the instant sonar system can substantially outperform conventional active sonar. Unlike conventional pulsed active transmission methods, the instant method herein requires a separate active broadband source and a receiver designed to process active target reflections in such a manner as to make the target appear as a passive acoustic source.

An embodiment for continuous transmission provides a means of constantly ensonifying a target while simultaneously reducing reverberation energy by varying frequency continuously as a function of time. An aspect of this continuous transmission scheme makes the target look like a constantly-emitting noisy passive acoustic source. Another aspect utilizes the consistency of the target scattering strength received over a broad frequency spectrum and the inconsistencies of backscatter from reverberation as a function of frequency. Still another aspect of this effectively large bandwidth approach provides computational simplicity of the signal processing, flexibility to achieve various levels of time and frequency diversity, detection gains in shallow water reverberation, and rapid assessment of target Doppler at any level for motion discrimination of both the high Doppler target and the slowly moving submerged threat; all culminating in a substantially improved performance over conventional active pulsed transmission sonar systems.

An aspect of an embodiment of the present transmission/reception method provides a combined effect of reverberation suppression obtained by extending the transmit energy over a wide frequency band and the reduced detection time obtained by utilizing persistent information received over time. The latter allows for averaging of the return energy over different frequency bands. The averaging gain of this approach is difficult to realize in conventional pulsed active systems. Furthermore, the broadband approach provides high resolution in range and, due to the continuous nature of reception, range rate (Doppler) is estimated rapidly to provide high fidelity target motion discrimination. For illustrative purposes, this analysis uses a single platform operation, however, the present method is suitable for multiple platform multi-static operation with any receiver platform possessing a passive narrowband detection capability.

Figure 6:
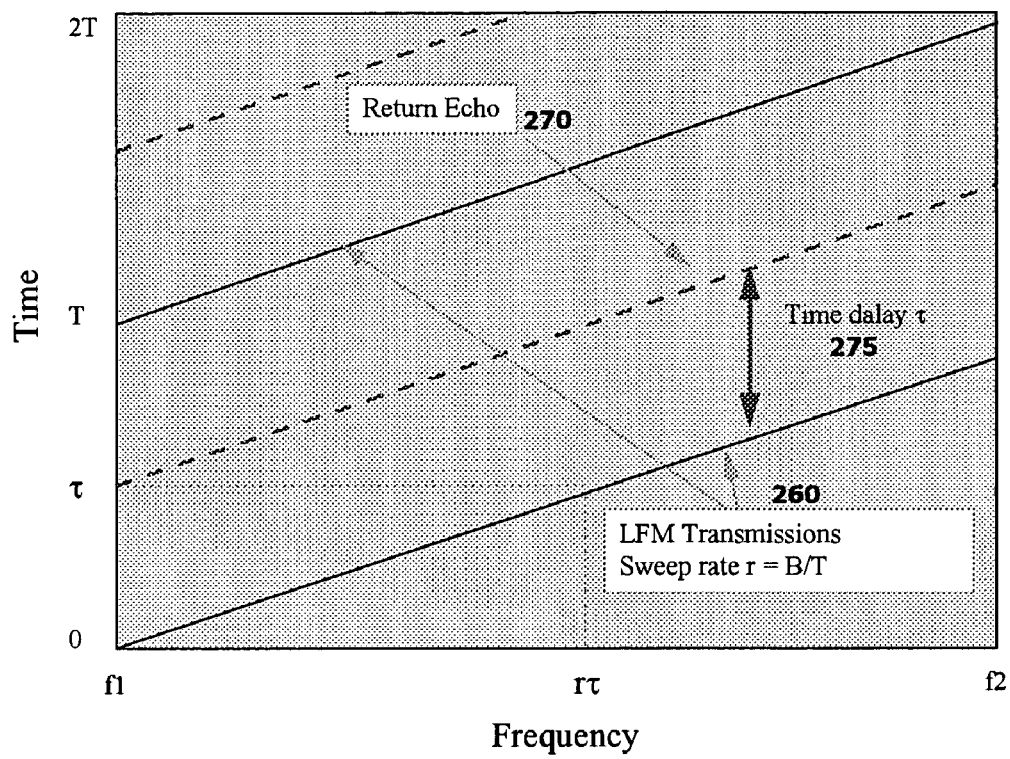
FIG. 6 is a graphical drawing showing transmit and receive waveforms, according to the present invention.

An aspect of an embodiment method as applied to the analysis of the slow moving target less than, but not limited to 1 knot, provides modification of the Frequency Modulated Continuous Wave (FM-CW) principles to work at low frequencies (LF); i.e., the transmitted waveform bandwidth can exceed the center frequency for this underwater acoustic detection problem. The transmission and the receiver processor are designed for a continuous linear frequency sweep over a large bandwidth. The sweep is continuously repeated (due to a practical limit on total available bandwidth) as illustrated in FIG. 6, effectively producing a saw tooth pattern in instantaneous frequency. FIG. 6 shows the time delay, τ, 275 between the low frequency modulated transmissions 260 and the return echo 260, where the transmit and wave forms are plotted in terms of frequency f=rτ along the horizontal axis, and time, T, the vertical axis.

The received data shown in FIG. 6 is complex-heterodyned (multiplied) with the transmit waveform and low pass filtered to obtain the resulting beat frequency (difference frequency). That is, the heterodyne processing produces beat frequency data corresponding to time delays. The minimum frequency is zero and the maximum beat frequency is equivalent to the transmitted bandwidth B given by $$r_{max}\tau_{max} = B \text{ where r is the sweep rate, and } \tau, \text{ time}$$

Tactical sonar requires removal of own-ship motion using both Doppler compensation on received beam data as well as a correction for geographic displacement over time. The own-ship Doppler correction for each receive beam is accomplished in the front-end heterodyne processing. The geographic displacement is performed as a time alignment in the passive narrowband (PNB) prediction function at the Fast Fourier Transform (FFT) output level.

Figure 7:
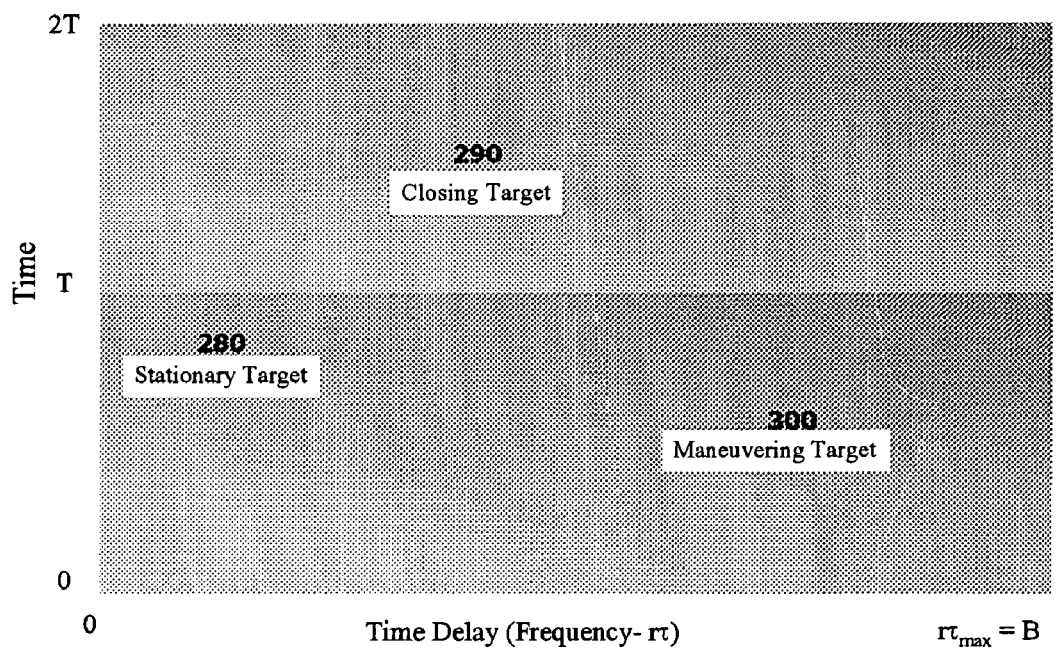
FIG. 7 is a graphical drawing showing heterodyne outputs for stationary, closing and maneuvering targets, according to the present invention.

By proper complex processing the saw tooth jump in the real transmission is transparent in the heterodyned output. For a return echo then, without a Doppler shift, the heterodyned output is a narrowband tonal with beat frequency, $f_b = r\tau$. The parameter, r, is the known sweep rate and τ is the two-way travel time which provides a measure of the target range. The output of the heterodyne process is depicted in FIG. 7, which shows the results obtained for a stationary target 280, closing target 290 and maneuvering target 300.

The continuous nature of the transmission reduces the active sonar detection problem to one of detecting a narrowband tonal in nonstationary noise. This allows the leveraging of passive narrowband (PNB) automatic detection and tracking. The nonstationary nature of the noise background in the active situation is due to the time-varying reverberation level. This contrasts with the pure ambient noise limited conditions most often encountered in passive sonar. However, with proper noise estimation and normalization techniques the background may be equalized and PNB techniques applied directly.

An aspect of an embodiment involves bandwidth availability. The latter dictates the tactical range coverage possible and also the amount of reverberation suppression obtainable. The repetition rate, T, and the maximum sweep rate r, for continuous transmission are determined by the system bandwidth, B, and the desired maximum target range coverage. The constraint on the repetition rate is similar to a pulsed active sonar where $$T \geq \tau_{max} = \frac{2R_{max}}{c}$$

must be satisfied to avoid range ambiguity. The sweep rate is constrained by the system bandwidth, the maximum sweep rate occurring when T is equal to the delay at maximum range coverage $$r_{max} = \frac{B}{T}$$

The sweep rate may be maximized to obtain the maximum reverberation suppression possible in a fixed amount of receive time and to maximize the time delay (range) resolution. Range resolution is inversely related to the observation time at the receiver, $T_r$, and the sweep rate used. Therefore the maximum range coverage is determined by the transmitted bandwidth and the sweep rate $$R_{max} = \frac{c\tau_{max}}{2} = \frac{cB}{2r_{max}}$$

In another aspect, the processing of the heterodyned output is designed to obtain the optimal detection performance for the expected target motion in all tactical scenarios.

An aspect of an embodiment of the present "receive-while-transmit (RWT)" invention provides detection SNR thresholds 7 dB lower in reverberation and 20 dB under Noise limited conditions than those currently achieved by conventional pulsed active systems. These performance gains of "RWT" transmission over a conventional pulsed sonar operating in a reverberation limited and noise limited environment can be obtained by examining the required recognition differential (RD) for each case. RDI accounts for the different processing gain (PG) of each method by removing the gain from the detection index (DT) required to achieve similar detection performance $$N_{RD} = DT - PG$$

Figure 8:
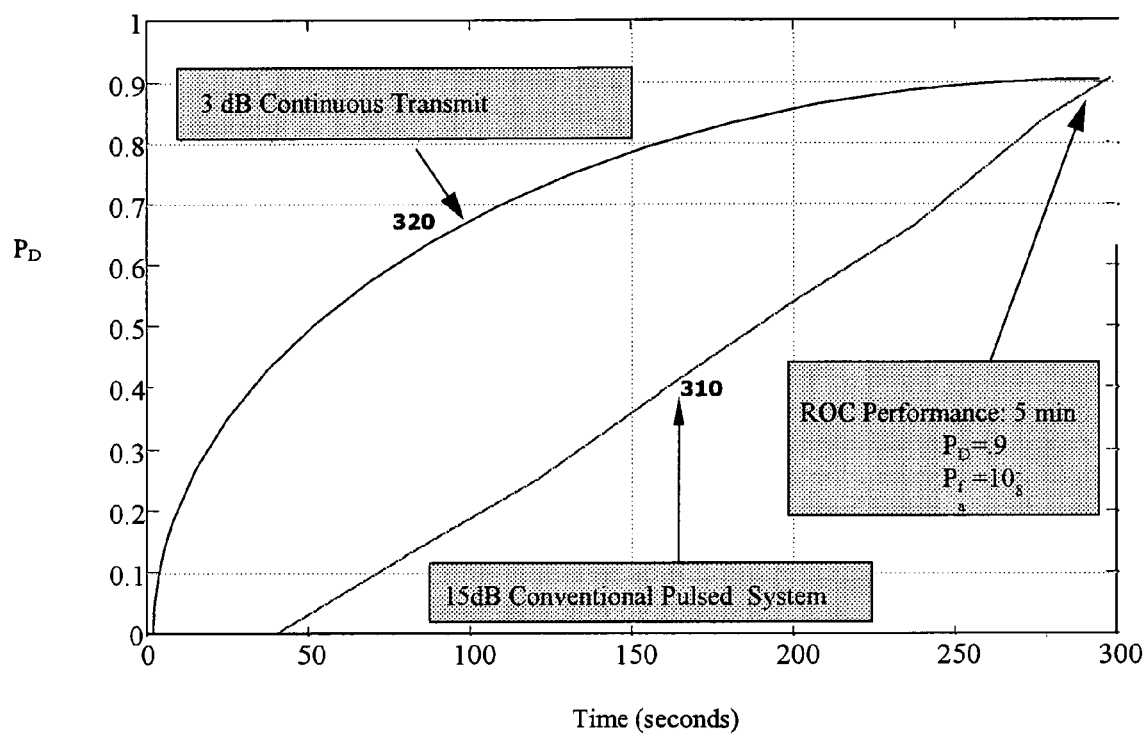
FIG. 8 is a graphical drawing showing probability of detection as a function of time, and demonstrating required detection level, according to the present invention.

The detection performance is obtained using the plots shown in FIG. 8 where curve 310 is for a conventional 15 dB pulsed system and curve 320 is for 3 dB continuous system. The probability of detection of 0.9 after 5 minutes with a false alarm probability, $P_f$, of $10^{-8}$ was chosen for each method. The detection index for the continuous transmission is $10*\log(d_{ct}) = 3$ dB and for the pulsed method, $10*\log(d_p) = 15$ dB. The only processing gain in reverberation for the pulsed system is due to the semicoherent averaging gain and the reverberation suppression per pulse $$N_{RD}^p = 10\log(d_p) - 5\log(N) - 10\log(BW)$$
$$= 10\log(d_p) - 5\log(10) - 10\log(100)$$
$$= -10 \text{ dB}$$

where 10 is the number of subpulses. The modified detection threshold for the continuous transmission method is adjusted to account for the continuous transmission receiver. Here the only adjustment to the detection threshold is due to bandwidth in each 4 second processed segment.

$$N_{RD}^{ct} = 10\log(d_{ct}) - 10\log(BW)$$
$$= 10\log(d_{ct}) - 10\log(100)$$
$$= -17 \text{ dB}$$

hence in reverberation the continuous transmit gain is $$\Delta N_{RD}^{Rev} = 7 \text{ dB}$$

The detection gains against noise are due to the increased energy in the continuous transmission which is reflected in the incoherent averaging gain achievable. The recognition differential in noise for the pulse system reflects the pulse length per sub-pulse $T_p$ so that $$N_{RD}^p = 10\log(d_p) - 5\log(N) - 10\log(T_p)$$
$$= 10\log(d_p) - 5\log(10) - 10\log(.2)$$
$$= 17 \text{ dB}$$

where for the continuous transmission the processing pulse length is 4 second and the gain in integration over the entire 40 seconds is captured in the detection threshold so $$N_{RD}^{ct} = 10\log(d_{ct}) - 10\log(4) = -3 \text{ dB}$$

Therefore a detection threshold gain in noise for the continuous transmit method is $$\Delta N_{RD}^{noise} = 20 \text{ dB}$$

Figure 9:
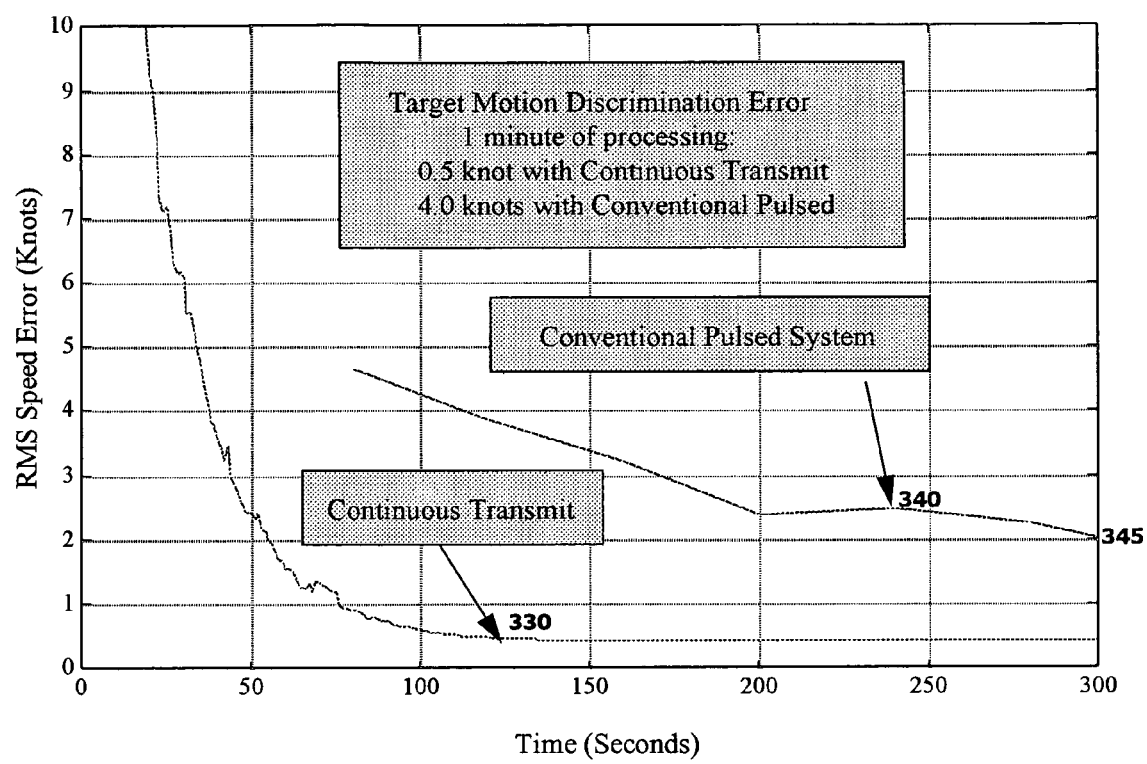
FIG. 9 is a graphical drawing showing root-mean-square (rms) speed estimation error as a function of time, demonstrating improved detection time in accordance with the present invention.

Another aspect of significant gain in performance of continuous transmission over conventional pulsed active sonars resulting from the increased rate of target information is the substantially more accurate, and more rapidly obtained target motion estimates as shown in FIG. 9. As seen in the same Figure, continuous transmit (curve 330) provides accuracy of target speed to a root-mean-square (rms) level of 0.5 knots (on the vertical axis) in less than 2 minutes (on the horizontal axis) where the pulsed system (curve 340) provides an rms error greater than 2 knots in the 5 minute receive time (345). Due to the accuracy of motion estimation, classification decisions based upon motion clues can be made far more rapidly and with greater accuracy using the methods of the present invention.

Though these numerous details of the disclosed methods and devices are set forth here, such as various parameters, to provide an understanding of the present invention, it will be obvious, however, to those skilled in the art that these specific details need not be employed to practice the present invention. At the same time, it will be evident that the same methods and devices may be employed in other similar situations that are too many to cite, such as the use of the methods cited herein with receivers having single or more multiple hydrophones.

Those skilled in the art will also know that although the continuous transmit concept itself—a subset of the present "Receive While Transmit (RWT)"—is used in a number commercially available Continuous Transmit Frequency Modulated (CTFM) Sonar systems, they cannot operate at certain frequencies (see for example, Skolnik, M. I., *Introduction to Radar Systems*, McGraw Hill, New York, 1962). Whereas many pulsed SONARS can operate at frequencies below 10 thousand cycles-per-second (10 kHz) current SONAR CTFM modes are confined to much higher frequencies. Operating frequencies for existing CTFM systems range from above thirty thousand (30 kHz) to in excess of three hundred thousand cycles-per-second (300 kHz). Although these high frequencies offer spatial resolution suitable to their purpose it is noted that no low frequency systems exist. This is because existing systems rely on a combination of highly directional transmitters and high in-water absorption loss to avoid overloading their receivers while transmitting, and high frequency sweep rates to facilitate frequency separation between transmitted signal and returned echoes. All of these conditions require high operating frequencies. Since absorption of sound in the water increases (and therefore operating range decreases) in proportion to the square of the operating frequency (see for example, R. J. Urick, *Principles of Underwater Sound*, McGraw Hill, New York, 1975) CTFM SONARS are limited to short range applications such as object avoidance or retrieval, and bottom or overhead under ice mapping. It will therefore be evident to those skilled in the art that modern high dynamic range electronics combined with the disclosed frequency domain filtering techniques overcomes the limitations of the present state of the art and enables a broad range of applications including low frequency long range search sonars such as those used in anti-submarine warfare.

While the invention has been particularly shown and described with reference to particular embodiments, those skilled in the art will understand that various changes in form and details may be made without departing form the spirit and scope of the invention.

What is claimed is:

1. An active sonar system for detecting object(s) in water comprising:
   a transmitter capable of continuously transmitting an acoustic signal;
   a receiver capable of receiving a reflected acoustic echo of said acoustic signal from one or more object(s), and a direct acoustic signal from said transmitter;
   wherein said receiver is capable of discriminating between said direct acoustic signal and
   said acoustic echo signal it receives from said object while said transmitter is transmitting;
   wherein said discrimination can occur when the direct acoustic signal is present at 60 dB or more above the acoustic echo signal.

2. The active sonar system of claim 1 wherein said transmitter is continuously transmitting said acoustic signal.

3. The active sonar system of claim 1 wherein said transmitter is transmitting an acoustic signal which is $\leq 12$ kHz.

4. The active sonar system of claim 1 wherein said transmitter is transmitting an acoustic signal which is $\leq 10$ kHz.

5. The active sonar system of claim 1 wherein said transmitter is transmitting an acoustic signal which is $\leq 5$ kHZ.

6. The active sonar system of claim 1 wherein said transmitter is transmitting an omni-directional acoustic signal.

7. The active sonar system of claim 1 wherein said transmitter is transmitting a signal with a reduced level of energy in the direction of the receiver.

8. The active sonar system of claim 7 wherein the energy is reduced from about 3 dB to about 60 dB.

9. The active sonar system of claim 7 wherein the energy is reduced from about 5 dB to about 25 dB.

10. The active sonar system of claim 7 wherein the energy is reduced from about 25 dB to about 55 dB.

11. The active sonar system of claim 1 wherein said transmitter is transmitting a frequency modulated signal.

12. The active sonar system of claim 11 wherein said transmitter is transmitting a sweeped frequency modulated signal.

13. The active sonar system of claim 11 wherein said transmitter is transmitting a linear sweeped frequency modulated signal.

14. The active sonar system of claim 11 wherein said transmitter is transmitting a sweeped frequency modulated signal wherein the transmitted sweep is amplitude tapered to avoid frequency discontinuities at the beginning and end of each sweep.

15. The active sonar system of claim 11 wherein the frequency modulated signal is amplitude tapered to avoid frequency discontinuities.

16. The active sonar system of claim 11 wherein said transmitter is transmitting a frequency modulated signal which is a frequency shift key.

17. The active sonar system of claim 14 wherein said transmitter is transmitting a frequency modulated signal which is a frequency shift key.

18. The active sonar system of claim 11 wherein said transmitter is transmitting a hyperbolic sweeped frequency modulated signal.

19. The active sonar system of claim 18 wherein said frequency modulated signal is amplitude tapered to avoid frequency discontinuities.

20. The active sonar system of claim 1 wherein said transmitter is transmitting a single frequency continuous wave.

21. The active sonar system of claim 20 wherein the continuous wave signal is amplitude tapered to avoid discontinuities at its beginning and end.

22. The active sonar system of claim 1 wherein said receiver is a single hydrophone.

23. The active sonar system of claim 1 wherein said receiver is an array of hydrophones.

24. The active sonar system of claim 1 wherein said receiver comprises a vector sensor or array of vector sensors.

25. The active sonar system of claim 1 wherein said receiver has a dynamic range greater than about 80 dB.

26. The active sonar system of claim 1 wherein said discrimination capability is achieved by temporal frequency filtering.

27. The active sonar system of claim 1 wherein said discrimination capability is achieved by spatial filtering which attenuates said direct signal.

28. The active sonar system of claim 1, wherein said object is in motion.

29. The active sonar system of claim 1, wherein said object is stationary.

30. The active sonar system of claim 1, wherein said system is capable of detecting said object at a range greater than 10 kiloyards from the receiver.

31. The active sonar system of claim 1, wherein said system is capable of detecting said object at a range greater than 5 kiloyards from the receiver.

32. The active sonar system of claim 1, wherein said system is capable of detecting said object is at the same depth as either said transmitter or said receiver.

33. The active sonar system of claim 1, wherein said system is capable of detecting said object at a depth other than the depth of either said transmitter or said receiver.

34. The active sonar system of claim 1, wherein said system is capable of detecting an object beneath an ocean floor.

35. The active sonar system of claim 1, wherein said system is capable of detecting an object at any bearing in respect of said receiver.

36. The active sonar system according to claim 1, wherein said acoustic signals comprise multi-frequency acoustic tone.

37. The active sonar system according to claim 1, wherein said transmitter and said receiver are separated by 12 acoustic wavelengths or less.

38. The active sonar system according to claim 1, wherein said discriminating between said acoustic signals includes bearing, range, and/or frequency domains.

39. The active sonar system according to claim 38, wherein said receiver meets a rejection requirement, in either or both said bearing and frequency domains, of rejecting said transmitted signal so that said signal does not raise detection thresholds in said receiver's search domain.

40. A method for detecting sonar signals comprising:
transmitting an acoustic signal;
receiving, during said transmission of said acoustic signal, a reflected acoustic echo of said acoustic signal from object(s), as well as directly receiving said acoustic signal;
processing a signal of said acoustic echo and said direct acoustic signal in a manner to discriminate between said acoustic echo signal and said direct signal when said direct acoustic signal is present at 60 dB or more above the acoustic echo signal.

41. The method according to claim 40, wherein said transmitting is accomplished by emitting a single frequency continuous wave.

42. The method according to claim 40, wherein said transmitting is accomplished by emitting an omni-directional acoustic signal.

43. The method according to claim 40, wherein said receiving is accomplished by using one or more hydrophones.

44. The method according to claim 40, wherein said receiving is accomplished by using a vector sensor or an array of vector sensors.

45. The method according to claim 40, wherein said discriminating is accomplished by performing temporal frequency filtering.

46. The method according to claim 40, wherein said discriminating is accomplished by performing spatial frequency filtering.

47. A method for detecting sonar signals comprising:
generating a waveform;
performing waveform shaping;
transmitting said waveform acoustically;
directly receiving said acoustic waveform and reflected echoes of said acoustic waveform;
performing temporal frequency rejection on said received acoustic waveforms;
optionally performing the step of spatially filtering said received acoustic waveform;
and optionally tracking said detected reflected echoes.

48. The method according to claim 47, wherein said transmitting said waveform is accomplished by emitting a single frequency continuous wave.

49. The method according to claim 47, wherein said shaping is accomplished by performing amplitude tapering.

50. The method according to claim 47, wherein said waveform shaping is performed to avoid signal discontinuities.

51. The method according to claim 47, wherein said waveform shaping is performed to avoid signal discontinuities.

* * * * *